UNITED STATES PATENT OFFICE.

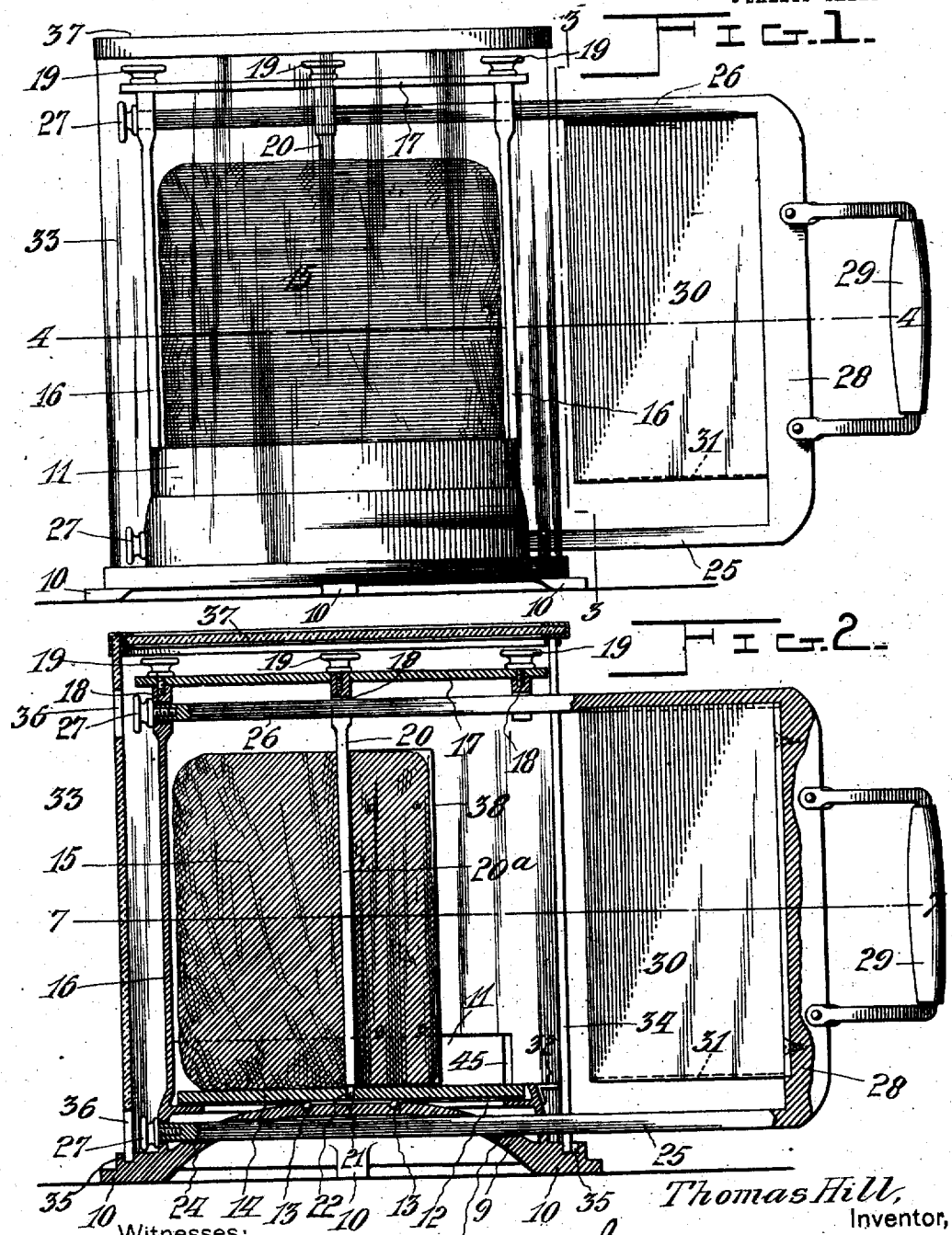

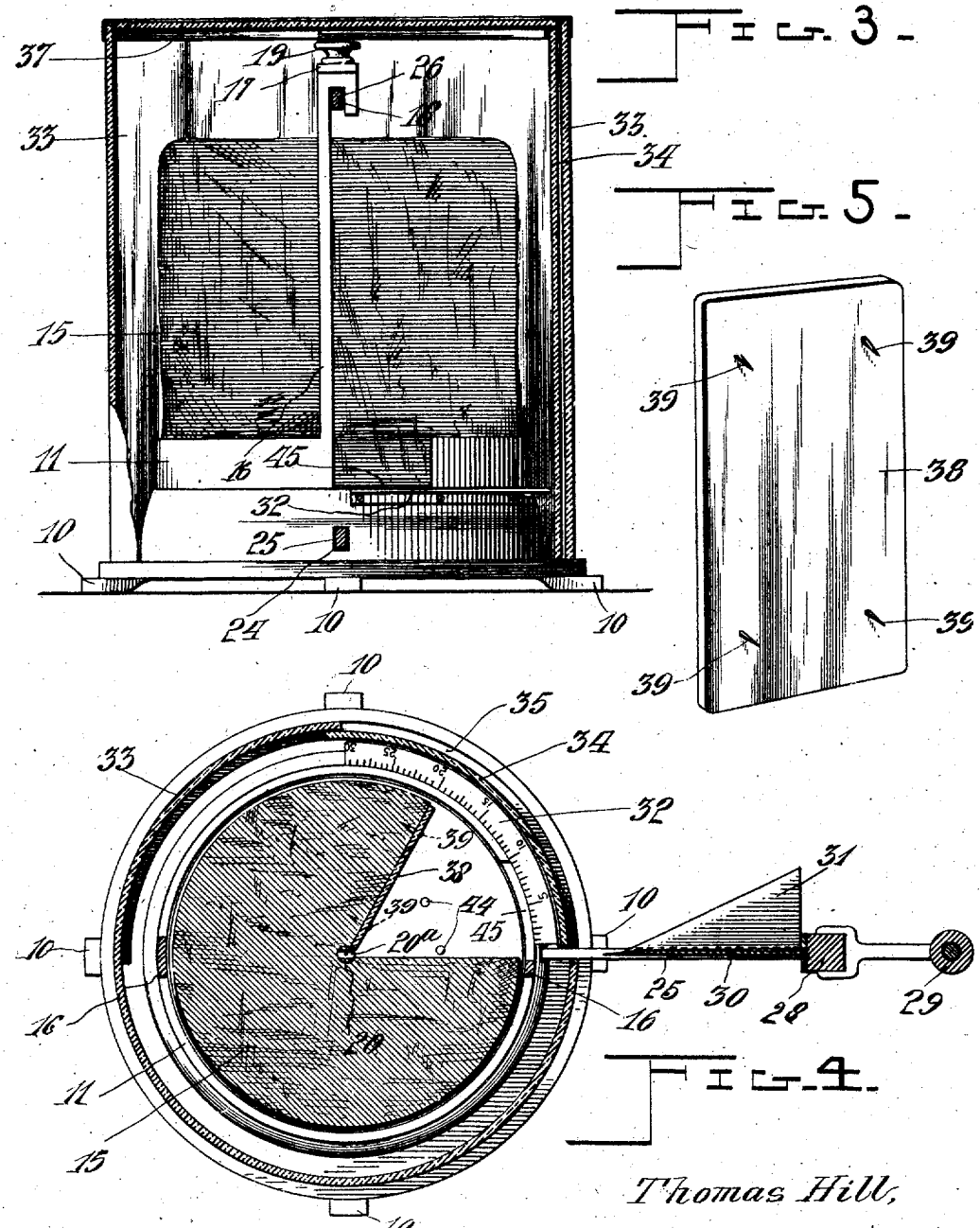

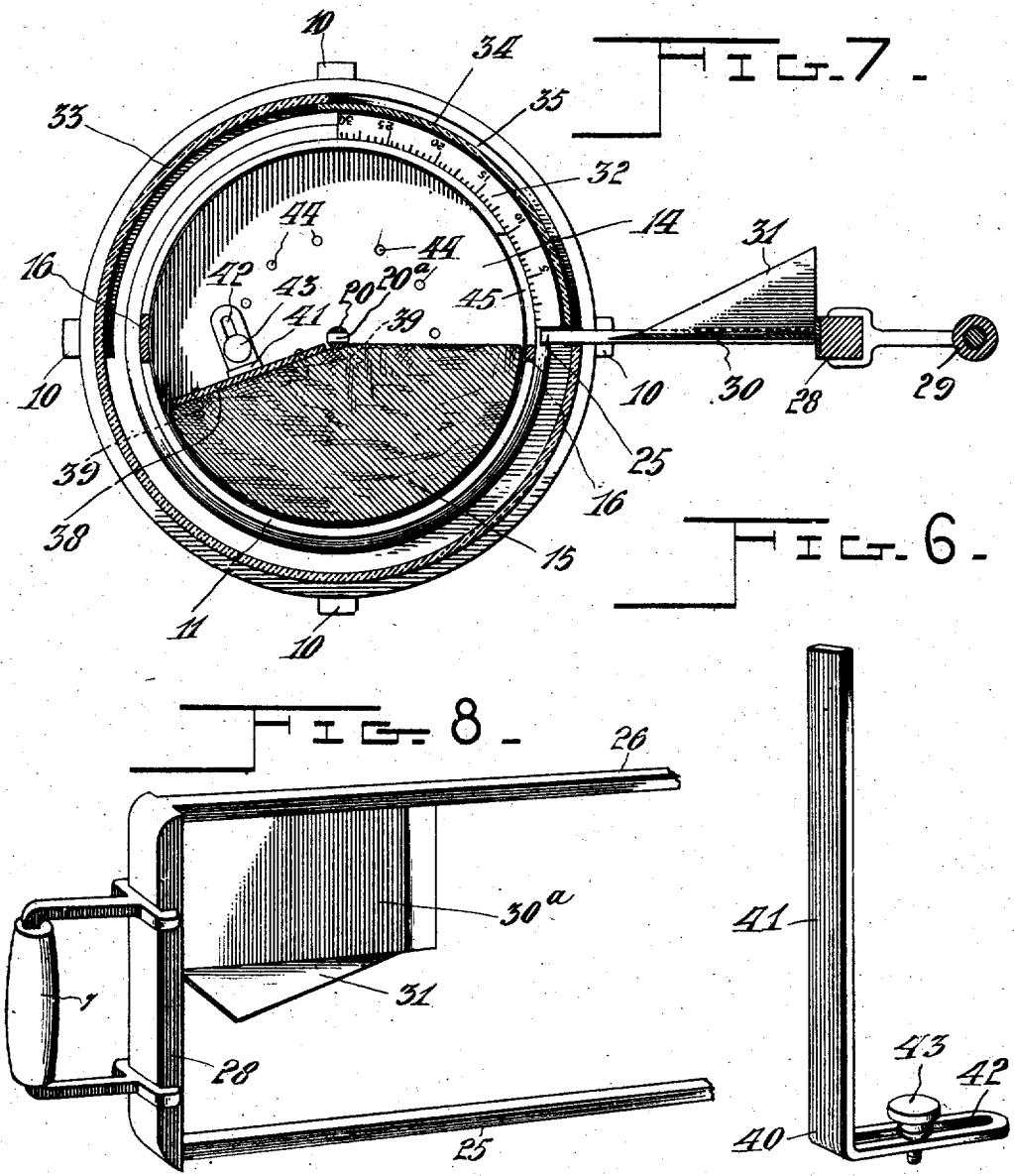

THOMAS HILL, OF JOGGIN MINES, NOVA SCOTIA, CANADA.

CHEESE-CUTTER.

No. 853,408.

Specification of Letters Patent.

Patented May 14, 1907.

Application filed July 20, 1905. Serial No. 270,439.

*To all whom it may concern:*

Be it known that I, THOMAS HILL, a subject of the King of England, residing at Joggin Mines, in the county of Cumberland, Province of Nova Scotia, Dominion of Canada, have invented certain new and useful Improvements in Cheese-Cutters; and I do hereby declare that the following is a full, clear, and exact description of the invention, such as will enable others skilled in the art to which it appertains to make and use the same.

My invention relates to cheese cutters; the object of my invention is to provide means for cutting a predetermined quantity of cheese from a cake; a further object is to keep fresh the edge of cheese left after a cake has been cut; a further object of my invention is to provide a casing adapted to preserve a cake of cheese free from the action of air and to provide an easily operated and simply constructed device of this class in which the knife is actuated horizontally; and, my invention consists of the construction, combination and arrangement of parts as herein described, illustrated and claimed.

In the accompanying drawings, forming part of this application, I have illustrated one form of embodiment of my invention, in which drawings similar reference characters designate corresponding parts and in which:

Figure 1 is a side elevation; Fig. 2 is a central vertical section; Fig. 3 is a vertical section on line 3—3 of Fig. 1; Fig. 4 is a horizontal section on line 4—4 of Fig. 1; Fig. 5 is a perspective of a plate used for keeping fresh the exposed edge of a cake of cheese; Fig. 6 is a perspective of a stop adapted to keep said plate in position and to maintain a cake of cheese in proper relation to the cutting knife after one-half of the cake has been cut; Fig. 7 is a horizontal section on line 7—7 of Fig. 2; and Fig. 8 is a perspective view of a modified form of knife.

Referring to the drawings 9 designates a convexed base supported in any suitable way as by the feet 10 formed integral therewith, and provided with an annular rim 11. Adjacent the rim 11 is provided a horizontal annular flange 12, said rim being integral with the base and said flange being integral with the rim. Disposed on the upper face of the base 9 are bearing members 13 such as balls on which is disposed a table 14 adapted to support a cake of cheese 15. As best shown in Fig. 2 the cake of cheese is disposed on the upper surface of the table 14, the rim 11 being adapted to guide said cake into proper position and said horizontal flange 12 being adapted to support the outer edge of the table 14 as it is revolved.

From opposite sides of the rim 11 extend upwardly standards 16 connected at their tops by a removable horizontal support 17 and having their upper ends formed with guide openings 18, said horizontal member being held in place by thumb-screws 19. From a central point on said horizontal member is disposed a downwardly extending rod 20, held in place by a thumb-screw 19 and provided with a guide opening 18. From a point below said guide opening 18 said rod is provided with a central longitudinal slot $20^a$ and its lower extremity is formed with a reduced portion 21 which is set into an opening 22 formed in the center of the table 14. A cake of cheese is set upon the table 14 the rod 20 is forced through the center thereof until its lower end engages in the opening 22 and the horizontal member 17 is placed in position and secured by means of the thumb-screws 19. The table may then be rotated and the rod 20 maintains the cake centrally thereof, the slot $20^a$ in said rod being provided to receive the inner vertical edge and limit the movement of a cutting knife hereinafter described.

The base 9 is provided with horizontal registering openings 24 through which is disposed a lower arm 25 an upper arm 26 parallel therewith being disposed through the openings 18 provided in the standards 16 and the upper end of the rod 20 as hereinbefore described. The rear end of each of these arms is provided with a thumb-nut 27 adapted to contact against the rear standard 16 and limit the forward motion of said arms. The outer ends of said arms are connected by an upright 28, having thereon a suitable handle 29. Connected to the inner face of the upright 28 is a vertical cutting blade 30 provided with a horizontal shelf 31 at its lower edge. The shelf 31 is adapted to contact with the wall of the slot $20^a$, and thereby limit the movement of the cutting blade 30 toward the center of the cheese to be cut. This blade may be secured to the upright 28 in any suitable way and such shelf may be formed integral with the blade or secured thereon, the blade being of such length as to reach to the bottom of the cake of cheese to be cut. It should be understood that the rim 11 adjacent the free portion thereof is provided with a slot 45 through which the blade 30 and its horizontal extension 31 is allowed to pass. A cake of cheese being in the position as shown the cutting blade is thrust back until its rear edge enters the slot 20$^a$ in the rod 20 and then withdrawn. The table 14 is then rotated to bring the cake of cheese to a proper position when the cutting blade may be actuated rearwardly again and a slice of cheese cut from the cake, as clearly appears from the drawings, particularly Fig. 4. A scale such as 32 (Fig. 4) is provided on or adjacent the rim 11 and may be arranged in any suitable way to indicate the point at which the cake of cheese should be cut to sever therefrom a predetermined quantity.

Disposed over the mechanism described is a cylindrical glass casing 33 provided on one side with a slidable door 34, the lower edge of said casing being disposed in a channel 35 formed in the base 9. A plurality of openings 36 are provided in said glass casing through which the parallel arms 25 and 26 may be reciprocated and said casing is provided with a flat top 37 as clearly shown in the drawings.

In order to keep fresh the surface left exposed to the air when a cake of cheese is cut there is provided a plate 38 having thereon projecting pins 39 by means of which said plate may be placed against such exposed surface and held in position, thereby keeping the exposed surface fresh.

After more than half of the cake of cheese has been cut (as illustrated in Fig. 7) it is evident that the rod 20 will not act to maintain the cake in position as well as it would when the cake was entire. Therefore I provide a stop 40 comprising an upright portion 41 and a slotted base 42. Disposed through the slotted base is a set screw 43 adapted to engage in the holes 44 formed in the table 14. The upright portion 41 of said stop being brought into engagement with the outer face of the plate 38 the remainder of the cake of cheese after one-half is cut away is maintained in the same position with relation to the line of travel of the cutting blade hereinbefore described.

For the purpose of cutting a cheese, so that the slice cut from a cake shall be equal in height to one-half of the height of the cake I provide a modified blade 30$^a$ which is illustrated in Fig. 8 and is the same as the blade already described except its vertical length is one-half of the distance between the members 25 and 26. By this arrangement the upper half of a cake of cheese is first cut leaving the lower half to be kept fresh by its outer wrapping of cloth.

Having thus fully described my invention, what I claim as new and desire to secure by Letters-Patent, is:

1. In a cheese cutter, the combination comprising a base, a table revolubly mounted on the base, a cutting member adapted to be actuated parallel to the table, and a casing disposed over the base.

2. In a cheese cutter, the combination comprising a base provided with a vertical rim, a table revolubly mounted on the base, a cutting member adapted to be actuated horizontally and parallel to the table, and a casing disposed over the base.

3. In a cheese cutter, the combination comprising a base provided with a horizontal flange, a table revolubly mounted on the base, the outer edge of which is adapted to be supported by said horizontal flange, a cutting member adapted to be actuated parallel to the table, and a casing disposed over the base.

4. In a cheese cutter, the combination comprising a base, a table revolubly mounted on the base, a ball bearing intermediate of the base and the table, a cutting member adapted to be actuated parallel to the table, and a casing disposed over the base.

5. In a cheese cutter, the combination comprising a base provided with openings therein and standards thereon provided with guide openings, a horizontal member connecting the standards, a table revolubly mounted on the base, a cutting member adapted to be actuated in a direction parallel to the table and comprising parallel members disposed in the openings in the base and the standards, a cutting blade carried by the parallel members, a shelf cutting member adjacent the cutting blade, and a handle, and a casing disposed over the base.

6. In a cheese cutter, the combination comprising a base, a table revolubly mounted on the base and provided with a central opening therein, a rod disposed in said opening, a cutting member adapted to be actuated transversely of and parallel to the table, and a casing disposed over the base.

7. In a cheese cutter, the combination comprising a base, a table revolubly mounted on the base and provided with a central opening therein, a rod disposed in said opening and provided with a longitudinal slot therein and a guide opening adjacent its upper end adapted to receive a blade carrying member, a cutting member adapted to be actuated horizontally transversely of the table so that its inner edge is adapted to enter said slot in said rod, said cutting member being provided with a horizontally projecting member adapted to contact with the wall of the slot and to limit the movement of the cutting member, and a casing disposed over the base.

8. In a cheese cutter, the combination comprising a base, a table revolubly mounted on the base, a cutting member adapted to be actuated horizontally and transversely of the table, means for limiting in one direction the movement of said cutting member, and a casing disposed on the base.

9. In a cheese cutter, the combination comprising a base, a table revolubly mounted on the base, parallel arms above and below said table, means connecting said arms, a cutting member carried by said arms and connecting means, guides supported from the base for said arms, and a thumb-nut secured on the end of each of said arms, and adapted to limit the movement thereof, and a casing disposed over the base.

10. In a cheese cutter, the combination comprising means for revolubly supporting a cake of cheese, parallel arms disposed respectively above and below the cake, an upright member connecting the outer ends of the parallel members, a cutting blade provided with a shelf cutting member secured to the upright member, means for guiding said parallel arms, and a casing disposed over said cake of cheese.

11. In a cheese cutter, the combination comprising a supporting base having a vertical rim thereon, a revoluble table disposed on the base, a reciprocatory cutting blade adapted to be actuated horizontally transversely of the supporting table, a scale disposed on said rim, and a casing having its lower edge disposed in a channel in said base.

12. In a cheese cutter, the combination comprising a base, a revoluble supporting table disposed on the base, parallel supporting members disposed above and below the revoluble table, a cutting blade carried by said parallel members whose length is one-half of the distance between said members, means for guiding said parallel members and a casing disposed over said revoluble supporting member and provided with openings adapted to permit the passage of said parallel members.

In witness whereof I have hereunto set my hand in the presence of two witnesses.

THOMAS HILL.

Witnesses:
 JAMES HENNESSY,
 F. C. WALTER.